(12) United States Patent
Ohno et al.

(10) Patent No.: US 6,290,138 B1
(45) Date of Patent: *Sep. 18, 2001

(54) WIRELESS DATA STORAGE MEDIUM WITH FLEXIBLE IMAGE RECORDING SECTION

(75) Inventors: Tadayoshi Ohno; Tsuneshi Yokota, both of Kawasaki; Toshio Takagi, Tokyo, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,275

(22) Filed: Sep. 14, 1998

(30) Foreign Application Priority Data

Sep. 19, 1997 (JP) .................................. 9-255806

(51) Int. Cl.⁷ ........................................ G06K 19/06
(52) U.S. Cl. ........................ 235/492; 235/380; 235/487
(58) Field of Search ................... 235/492, 379, 235/380, 382, 472.02, 487, 462.46

(56) References Cited

U.S. PATENT DOCUMENTS

| | | | |
|---|---|---|---|
| 3,438,489 | * | 4/1969 | Chazot ................................. 235/380 |
| 5,030,807 | * | 7/1991 | Landt et al. ........................ 235/375 |
| 5,151,684 | * | 9/1992 | Johnsen ................................ 340/572 |
| 5,340,968 | * | 8/1994 | Watanabe et al. .................... 235/380 |
| 5,534,372 | * | 7/1996 | Koshizuka et al. .................. 235/380 |
| 6,024,578 | * | 2/2000 | Dandl .................................. 434/437 |

FOREIGN PATENT DOCUMENTS

| | | |
|---|---|---|
| 0 587 115 | 3/1994 | (EP) . |
| 4-368894 | 12/1992 | (JP) . |
| 9-104189 | 4/1997 | (JP) . |

OTHER PUBLICATIONS

Patent Abstracts of Japan vol. 017, No. 248 (M–1411), May 18, 1993 & JP 04 368894 A (Omron Corp), Dec. 21, 1992 *abstract*.

Patent Abstracts of Japan vol. 1997, No. 08, Aug. 29, 1997 & JP 09 104189 A (Denso Corp), Apr. 22, 1997 *abstract*.

* cited by examiner

Primary Examiner—Karl D. Frech
Assistant Examiner—Daniel St. Cyr
(74) Attorney, Agent, or Firm—Pillsbury Winthrop LLP

(57) ABSTRACT

A wireless data storage medium comprising an image recording section for rewritably recording and displaying a visible image, and wireless data storage means less in flexibility produced by bonding the wireless data storage section with the image recording section in such a manner that only part of a whole structure of the wireless data storage section is superposed on part of a whole structure of the image recording section, for storing and reading data on a memory for storing data by performing communication with an external system by use of the memory and an antenna.

10 Claims, 5 Drawing Sheets

WIRELESS DATA STORAGE MEDIUM WITH FLEXIBLE IMAGE RECORDING SECTION

BACKGROUND OF THE INVENTION

The present invention relates to a wireless data storage medium suitable as a commodity tag or label which is attached to a commodity, for example, in order to perform a predetermined processing on the commodity. More particularly, the present invention relates to a wireless data storage medium, which can read or write data in a non-contact condition through radio communication.

Attention has been drawn to a wireless data storage medium as a next generation carrier, comprising a data storage element such as an IC memory or the like and a wireless transmitter-receiver section, which wirelessly communicates with an external system in order to read or write data on the data storage element for control in a non-contact condition.

Such a wireless data storage medium has been fabricated with an IC chip, and attached to a commodity as a radio tag and utilized for a shoplift preventive system or as a ski lift ticket in a skiing resort in an incorporated manner. Alternately, a new utilization has been tried in which the medium is embedded in a card and the card is to be used as a commuter card in a wirelessly processed automatic card examination system.

In the system in which a wireless data storage medium is employed, a predetermined processing can be performed in a non-contact condition without inserting the wireless data storage medium (a card or a tag) into a processing apparatus, whereby convenience which has never been available in a conventional system can be enjoyed.

A radio tag generally has no visible image display section. Such a form and a condition of the storage medium are not problematic in a system in which it is not required to show data on a commodity to which the medium is attached directly to a person or a customer as in the case of a shoplift preventive system.

In addition, various kinds of system utilizing a radio tag have been proposed. For example, if a radio tag is used for a price tag of a commodity and settlement of the account when a customer purchases commodities is processed by wirelessly reading price data stored on the tags attached to the commodities, the settlement of the account can be more efficient as compared with a current available system. However, this system requires that a purchaser can confirm a commodity price for its own.

Besides, there is a case where a radio tag is utilized in a physical distribution field, in which a radio tag is attached to a commodity and data peculiar to the commodity written on the radio tag attached thereto is read at points in the distribution system, whereby a flow of commodities can centrally be controlled by a single control system.

Furthermore, it is considered that a radio tag is utilized in production control when the radio tag is attached to a work in process. In this system, a visible display of data on the work which can be recognized by an operator in the working area or a manager is indispensable since an unforeseeable accident, such as breakage of a price tag attached to the work or communication trouble is taken care.

In order to solve such a problem, for example, a non-contact recording medium is disclosed in Jpn. Pat. Appln. KOKAI Publication No. 4-368894, which includes a non-contact recording means, and on whose surface a visible data recording area made from a rewritable heat-reversible material is provided. In this non-contact recording medium, non-contact recording means is included therein and a recording area on which visible data is rewritable by application of heat is formed on the surface.

Besides, for example, a data recording medium is disclosed in Jpn. Pat. Appln. KOKAI Publication No. 9-104189, in which an ID data is stored through transmittance and reception by an antenna with an external system, and in which a circuitry (a semiconductor section) which outputs the ID data to the external system is included, wherein a print medium, printable and erasable, is provided on the surface of the dat a recording medium and an data relating to the ID data is printed on the print medium However, the above mentioned conventional wireless data storage media each have such a form and a condition as to be rigid or comparatively scarce in flexibility in order to protect electronic components such as a data storage element, a radio transmitter/receiver section, an antenna section and the like from breakage caused by a mechanical stress and a image display section is formed on a surface of such a rigid body.

A wireless data storage medium of such a form and a condition as this is suitable for the case where a person carries the medium, but since the wireless medium is not flexible, there has problematically been arisen various kinds of restrictions for attachment of the wireless data storage medium in the case that the wireless data storage medium is utilized as a price tag, a parcel tag, a production process control tag or the like.

In a data storage medium disclosed in Jpn. Pat. Appln. KOKAI Publication No. 9-104489, an electronic component is formed on a base material like paper and a print medium on which a visible image can repeatedly be printed is fixed thereon. For this reason, while this data storage medium is excellent in flexibility, the electronic component has a risk of breakage by a mechanical stress.

BRIEF SUMMARY OF THE INVENTION

The present invention has an object to provide a wireless data storage medium, which is excellent in protecting an electronic component from breakage caused by a mechanical stress, and which is suitable as a commodity tag or label which is attached to perform a predetermined processing on the commodity.

The present invention is directed to a wireless data storage medium which stores data and supplies data for external, which comprises: an image recording section for rewritably recording and displaying a visible image; and wireless data storage means, which is provided in bonding with the image recording section in such a manner that only part of a whole structure of the wireless data storage section is superposed on part of the whole structure of the image storage section having storage means for storing data, an antenna, and wireless storage means for storing or reading data on the storage means by effecting communication with an external system by the antenna.

Since the present invention has the above mentioned structure, the structure of the present invention is not a structure in which an inflexible structure of a wireless data storage section occupies the central portion of an apparatus and a display section is formed in a part of the structure, that is, not conventional ones lacking elasticity as a whole, but an image recording section which has flexibility occupies the central portion of the whole apparatus, and a wireless data storage section which is not flexible is disposed, for example, at a corner portion of the whole apparatus in such a manner that the wireless data storage section is superposed on part of the image recording section, whereby the wireless data storage medium of the present invention can assume a flexible user-friendly structure as the whole apparatus. According to the present invention, therefore, for example, provided is an apparatus which is easy to be mounted such as a radio commuter card since, even if the wireless data storage medium is put in a pocket of clothes of a person who carries the medium, the medium is not broken by a mechanical stress.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1A:
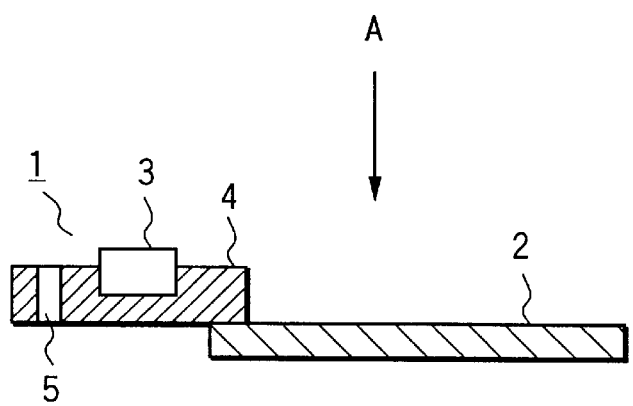
FIG. 1A is a longitudinal sectional view as seen from a side showing a model of a wireless data storage medium pertaining to a first embodiment.

Described will be embodiments of the present invention in reference to the accompanying drawing.

First, a first embodiment will be described in reference to the drawing.

Figure 1B:
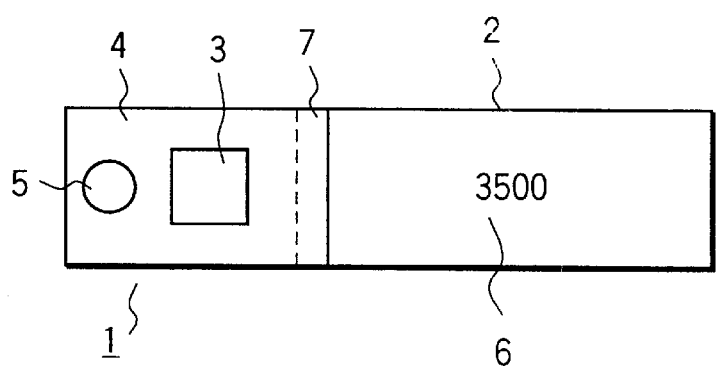
FIG. 1B is a front view as seen from in the direction of an arrow mark A of FIG. 1A showing the model of a wireless data storage medium pertaining to a first embodiment.

FIGS. 1A, 1B show a model of a wireless data storage medium pertaining to the first embodiment. The wireless data storage medium pertaining to the first embodiment comprises a wireless data storage section 1 described later and an image recording section 2 in the shape of a thin leaf sheet recording and displaying a visible image. The wireless data storage section 1 serves for transmitting or receiving data by radio communication in a non-contact condition and in addition storing or reading out data, comprises a wireless data storage element 3 which is included in a resin mold case 4. The mold case 4 has a durability enough for protecting the wireless data storage element 3 included therein against an external mechanical stress. Provided is a through-hole 5 for threading a cord therethrough at an end of the mold case 4 for tying the wireless data storage medium to a commodity.

The image recording section 2 is more flexible than the wireless data storage section 1 and can be bent. A visible image ([3500]) 6 is recorded on the image recording section 2. In this embodiment, the wireless data storage section 1 and the image recording section 2 are bonded at a boding section 7 and the whole of a wireless data storage medium is thus constructed.

A feature of the wireless data storage medium of this embodiment is that the wireless data storage section 1 and the image storage section 2, which are independently constructed are bonded in the bonding section 7 to be one body in such a manner that only part of the image recording section 2 is superposed on the wireless data storage section 1. Therefore, a bonding structure can be formed in various methods and structures as far as the bonding structure does not interfere with the above mentioned main structure and it is understood that a bonding structure is not limited to the structure shown in the embodiment.

As mentioned above, the wireless data storage medium has conditions that the image recording section 2< the wireless data storage section 1 in rigidity and the wireless data storage section 1< the image recording section 2 in flexibility and the medium has a structure that the wireless data storage section 1 which has a durability enough for protection the wireless data storage element 3 included against an external mechanical stress and the image recording section 2 excellent in flexibility are bonded into one body, whereby the wireless data storage section 1 is hard to be broken but the wireless data storage medium has a flexibility as a whole.

Described will be the wireless data storage section 1 in a concrete manner below.

Figure 2:
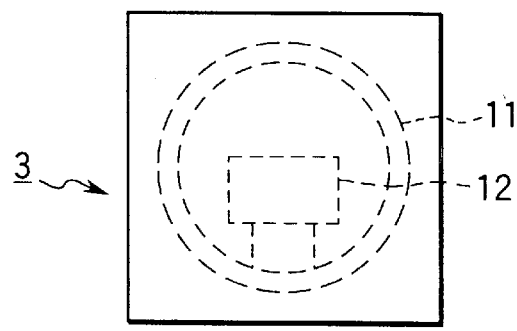
FIG. 2 is a top view showing a model of a structure of the wireless data storage medium in FIG. 1A.

FIG. 2 shows a model of a structure of the wireless data storage element 3. The wireless data storage element 3 comprises a transmit/receive antenna 11 constructed from a loop like coil or the like, and an LSI chip 12, which are simultaneously mold in a mold case 4 with rigidity in one body but as independent components.

In such a manner, since the wireless data storage element 3 of the wireless data storage section 1 is molded in the base material with rigidity in one body, it is excellent in mechanical durability and has high reliability as well. In this embodiment, a size of the wireless data storage section 1 is 30×40 $mm^2$.

Figure 3:
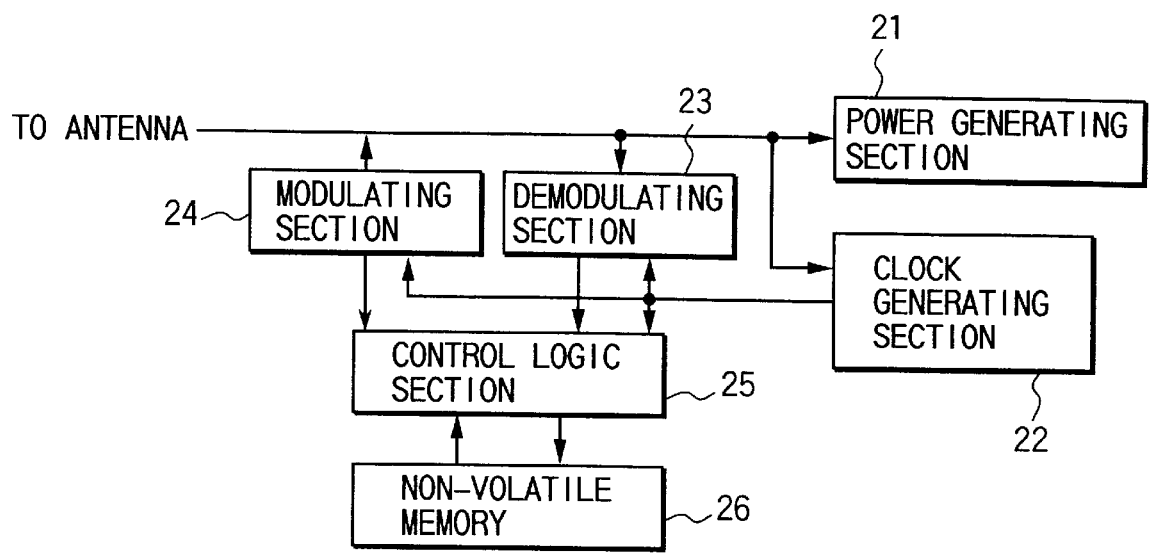
FIG. 3 is a block diagram showing a main circuit structure of an LSI chip in FIG. 2.

FIG. 3 shows a structure of a main circuit of the LSI 12 shown in FIG. 2, comprising a power generating section 21, a clock generating section 22, a demodulation section 23, a modulating section 24, a control logic section 25 and a non-volatile memory 26 as storage means.

That is, when a modulated data signal transmitted from an external system is received by the transmit/receive antenna 11, the modulated data signal is sent to the power generating section 21 and the clock generating section 22. In the power generating section 21, the modulated data signal is rectified and stabilized and a power source for supplying power to sections is generated. In the clock generating section 22, a clock pulse is generated from the modulated data signal and supplied to the sections. The received modulated data signal is also supplied to the demodulation section 23 and demodulated here, and a demodulated data is stored on the non-volatile memory 26 by action of the control logic section 25.

On the other hand, when an external read instruction is received, data is read from the non-volatile memory 26 by action of the control logic section 25, the data is modulated in the form suitable for radio communication in the modulation section 24 and thereafter, a modulated data is transmitted to the outside through the antenna 11.

Then, described will be the image recording section 2. The image recording section 2 has features that it can record a visible image therein, has the shape of a sheet and excellent flexibility and has a larger percentage of occupancy than the wireless data storage section 1 in the whole system.

As described above, since the image recording section 2 which is large in occupancy in the wireless data storage medium is excellent in flexibility, the medium is easy to be mounted to a commodity of even any shape. A thickness of the image recording section 2 is different in dependence on a kind of the base material, but generally, it is preferably adopted to be 1 mm or less, or especially it is preferred to be in a range of 500 to 10 $\mu$m. A shape and size of the image recording section 2 can be selected so as to be suitable for each purpose in applications such as a price tag, a parcel tag, a process control tag, a distribution control tag and the like.

Below the image recording section 2 will be described in a concrete manner.

Figure 4:
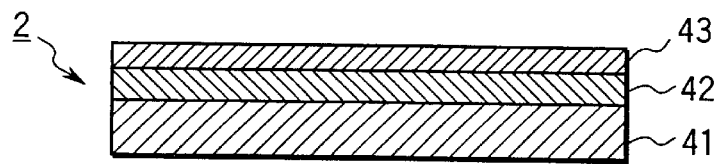
FIG. 4 is a longitudinal sectional view as seen from a side showing a model of a structure of an image recording section in FIG. 1A.

FIG. 4 shows a model of a structure of the image recording section 2. In FIG. 4, a numeral mark 41 indicates a base material in the shape of a sheet and one side surface of the base material 41 has a rewritable recording layer 42, in which a visible image can repeatedly recorded or erasable, and a protective layer 43, sequentially formed thereon.

As the base material 41, there can be used, for example, a plastic sheet such as polyethylene terephthalate (PET), vinyl chloride, polycarbonate or the like, or paper, synthetic paper or the like. As in this embodiment, in the case where the image recording section 2 can used in a plurality of times, that is repeatedly storing or erasing for rewriting an image is possible, it is preferred to use a base material with mechanical durability such as a plastic sheet, a synthetic paper and the like. A thickness of the base material preferably is 1 mm or less, or especially it is preferred to be in a range of 500 to 10 $\mu$m. In this embodiment, a PET sheet with a thickness of 188 $\mu$m was used.

As a rewritable recording layer 42, there can be used: color developing rewritable recording material, a high molecular matrix/low molecular composite film material, a magnetic capsule memory material and the like.

An example of the color developing rewritable recording material is a leuco dye based rewritable heat sensitive recording material, which is composed of a leuco dye and a reversible color developing agent. As an example of the reversible color developing agent, named is a compound having a color developing/subtracting agent and a long chain alkyl group.

As the color developing/subtracting agent, used is a compound which have an acidic portion and a basic portion in the same molecule thereof. As examples of such a compound, named are: a salt between phenol carboxylic acid and an organic amine, a complex salt between a phenol compound and an organic amine and an organic amphoteric compound. Such compounds are disclosed in Jpn. Pat. Appln. KOKAI Publication Nos. 6-191150 and 6-191151.

As compounds each having a long chain alkyl group that reveals reversibility, named are an ascorbic acid compound, a phosphonic acid compound, a phenol compound and the like. The rewritable recording compound develops a color in room temperature by heating or melting and the colored rewritable recording compound loses its color by being heated at a lower temperature than a color developing temperature and returns to a non-colored condition at room temperature. Such storage materials are disclosed in Jpn. Pat. Appln. KOKAI Publication Nos. 5-96852 and 5-193257.

A leuco dye which is used in combination with a reversible color developing agent is not specifically restrictive as far as it is an electron donor and conventionally well known, for example, fluoran based compounds can be used. Leuco dyes can be used as color recording materials, which develop black, red, blue, yellow and the like respectively in dye compounds thereof.

A high molecular matrix/low molecular composite film rewritable recording material is a reversible heat sensitive recording material which shows a white cloudy or transparent condition in a reversible manner depending on a different temperature. When it is used as a recording medium, a recording condition is selected so as to be one of whether a colored layer lying under a rewritable recording layer is visible (a transparent condition) or the color layer under the rewritable recording layer is non-visible (a white cloudy condition). A material of the rewritable recording layer is a film which is made of a material prepared in such a manner that an organic low molecular compounds, for example a higher fatty acid such as stearic acid behenic acid or the like is dispersed in a resin such as vinyl chloride resin, vinyl chloride-vinyl acetate copolymer or the like. Such storage materials are disclosed in Jpn. Pat. Appln. KOKAI Publication Nos. 2-1363, 3-2089, 4-201596 and the like.

As an example of the magnetic capsule recording material, there is available a material which is prepared in such a manner that metal fine particles constituted of iron flakes, nickel flakes, iron-nickel-chromium alloy flakes or the like are sealed in capsules together with a medium vehicle composed of a polar solvent and a thermoplastic resin and such capsules are applied on a sheet. When the sheet is place in a magnetic field, there arise a portion where metal particles in the shape of flakes are oriented along a direction of the magnetic field and a portion where the metal particles are not oriented and such difference in orientational behavior of the metal particles reveals different appearances under incident light on the surface when observed with the naked eye, which are respectively used as recording and erase conditions. Such materials are disclosed in Jpn. Pat. Appln. KOKAI Publication Nos. 5-24384 and 9-71042.

The rewritable recording layer 42 of this embodiment was prepared in such a manner that a leuco dye and a phenol compound having a long chain alkyl group were dispersed in a resin, the resin with the dispersion was applied on a PET sheet with a thickness of 188 μm as a base material 41 and the coat was dried, wherein a thickness of a formed rewritable recording layer 42 was about 5 μm.

A protective layer 43 was formed in such a manner that a ultraviolet curing resin was applied on thus prepared rewritable recording layer 42 and subsequently the coat was cured as protective layer 43, wherein a thickness of the protective layer 43 was about 5 μm.

In such a manner, formed was a rewritable recording medium in the shape of a sheet with very excellent flexibility having a thickness of about 200 μm.

Thus prepared rewritable recording medium was cut into the shape of a label with a length of 60 mm and a width of 30 mm. With use of this as an image recording section 2, as shown in FIG. 1B, the case 4 of the wireless data storage section 1 and the base material 41 of the image recording section 2 were bonded to form the a boding section 7 by fixing with a curing adhesive. Thus, a wireless data storage medium of a price tag rewritable recording type pertaining to this embodiment was obtained.

The wireless data storage medium has no chance to be separated into parts since the wireless data storage section 1 and the image recording section 2 are strongly bonded by a curing adhesive.

Figure 5:
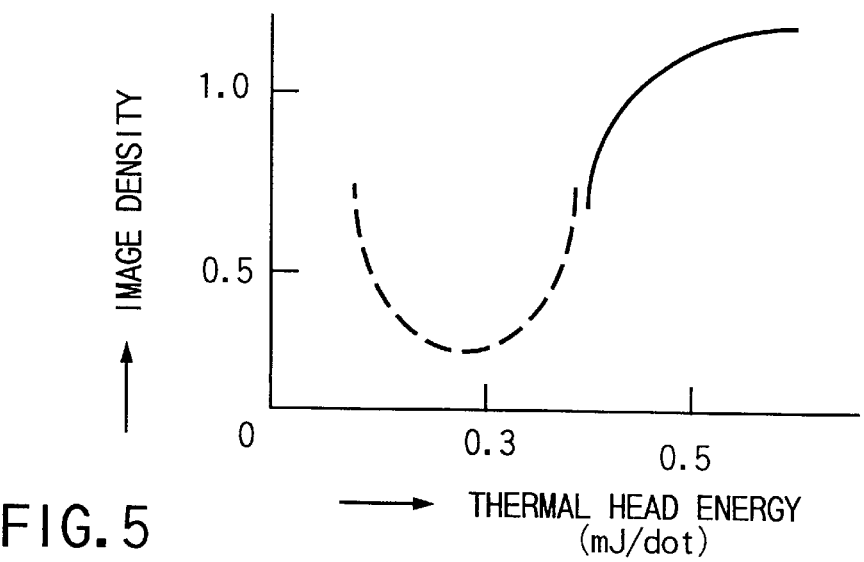
FIG. 5 is a graph showing a recording characteristic by a thermal head for the image recording section.

Then described will be a color development and color loss in the rewritable recording layer 42 of the image recording section 2 using FIG. 5. FIG. 5 shows a characteristic of a change in image density when an applied energy to a thermal head is changed, wherein the thermal head with a resolution of 8 dots/mm is driven relatively to the image recording section 2 and a solid pattern is recorded at a transport speed of 40 mm/sec. The ordinate represents an image density of the image recording section 2 and the abscissa represents the applied energy of the thermal head given to the image recording section 2. Besides, a solid line in the figure shows a density change when heat for recording the solid pattern is given to the image storage section 2, in which recording has not been performed in an initial condition, and a broken line shows a density change when heat to erase a solid pattern recorded in the image recording section 2 is given thereto.

In such a manner, in the image recording section 2, an image can repeatedly be recorded or erased by changing the applied energy of the thermal head which is a recording head. Herein, the recording energy is set at 0.6 mJ/dot and an erasing energy is set at 0.3 mJ/dot to repeat image recording and erasing on the image recording section 2.

The rewritable recording material has been known in which erase is more sufficiently achieved when the material is exposed to a gradual temperature change by a large capacity heat source, such as a hot stamper, a heat roller and the like rather than being exposed to a rapid temperature change, like when heating by the thermal head.

Therefore, when sufficient erase is not obtained, it is preferred that a hot stamper or a heat roller is used instead as a heat source. For the material of this embodiment, erase was completed down to the full depth at about 65 to 75° C.

A feature of a wireless data storage medium pertaining to he first embodiment is that a wireless data storage section and an image recording section are independently fabricated and then both are bonded to be one body. Another feature is that an area occupancy ratio of an image recording section or an image recording area to the total area of a wireless data storage medium is larger than that of a wireless data storage section. The wireless data storage section is rigid and strong against an external mechanical stress and the image recording section is excellent in flexibility and soft, and in addition the occupancy ratio to the whole of the wireless data storage medium is large, which enables its deformation to be easy.

When a rewritable recording layer is used for an image recording section as in the above shown embodiment, since an image can repeatedly be recorded or erased and data can also repeatedly be stored or erased in a wireless data storage section, it is effective to display in an non-rewritable image area further added. Since a structure is employed that a wireless data storage section and an image recording section are bonded, both are free in selecting each own size.

While such a thing as called a radio tag as a wireless data storage element which has conventionally been available requires a gadget like a reader/writer as read means in order to confirm a content, a wireless data storage medium of this embodiment has a rewritable recording layer like a sheet, a predetermined data or part thereof stored in the wireless data storage element is displayed in a visible manner and is not expensive and recycled with ease.

Next, a second embodiment will be described.

Figure 6:
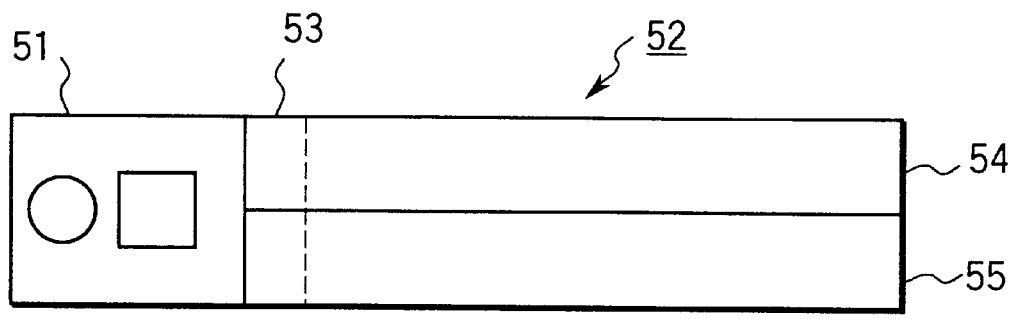
FIG. 6 is a top view showing a model of a wireless data storage medium pertaining a second embodiment.

FIG. 6 shows a model of a wireless data storage medium pertaining to the second embodiment. A wireless data storage medium pertaining to the second embodiment comprises a wireless data storage section 51 and a two-color rewritable recording type image recording section 52. As in the case of the first embodiment, both are bonded into one body at a bonding section 53. Since the wireless data storage section 51 has the same structure as the wireless data storage section 1 described in the first embodiment, description thereon is omitted.

The image recording section 52 comprises a first rewritable recording layer 54 in which a black colored image can repeatedly be recorded or erased and a second rewritable recording layer 55 in which a red colored image can repeatedly be recorded or erased and both layers are disposed in parallel to each other as shown in the figure.

Below described will be the image recording section 52 in a concrete manner.

A reversible heat sensitive recording material in combination of a leuco dye and a phenol compound with a long chain alkyl group can achieve development in different colors by changing a kind of a leuco based dye as has been mentioned. Therefore, for the first rewritable recording layer 54, a phenol compound with a long chain alkyl group and a leuco dye developing black are dispersed in a resin and for the second rewritable recording layer 55, a phenol compound with a long chain alkyl group and a leuco dye developing red are dispersed in a resin and coat layers were formed as a two-color rewritable recording layers respectively by applying both coating solutions on a PET sheet (not shown) as a base material with a thickness of 188 μm in a pattern composed of repetitions of a stripe with a width of 15 mm and drying the coats.

Thus fabricated first and second rewritable recording layers 54, 55 were provided with a protective layer (not shown) by applying and curing an ultraviolet curing resin thereon, wherein a thickness of the protective layer was about 5 μm.

In such a manner, a two-color rewritable recording medium like a sheet with very excellent flexibility having a thickness of about 200 μm.

Thus fabricated two-color rewritable recording medium was cut into a piece like a label with a length of 60 mm and a width of 30 mm (in a direction of a shorter dimension of a color stripe). The piece is used as the image recording section 52 and as shown in FIG. 6, the wireless data storage section 51 and the image recording section 52 were bonded to form a bonding section 53 by a curing adhesive. Thus a two-color rewritable recording type wireless data storage medium pertaining to the embodiment was completed.

In the embodiment, recording and erasing sensitivities in thermal head recording of the rewritable recording layers 54, 55 were set to be the same as each other. With such a design concept, if image data to be recorded are respectively made to correspond to the rewritable recording layers in conformity with locations of the rewritable recording layers, there is no need for change in recording and erasing energies of the thermal head which is a recording head according to a recording color, whereby specific consideration is not required in record control.

Figure 7:
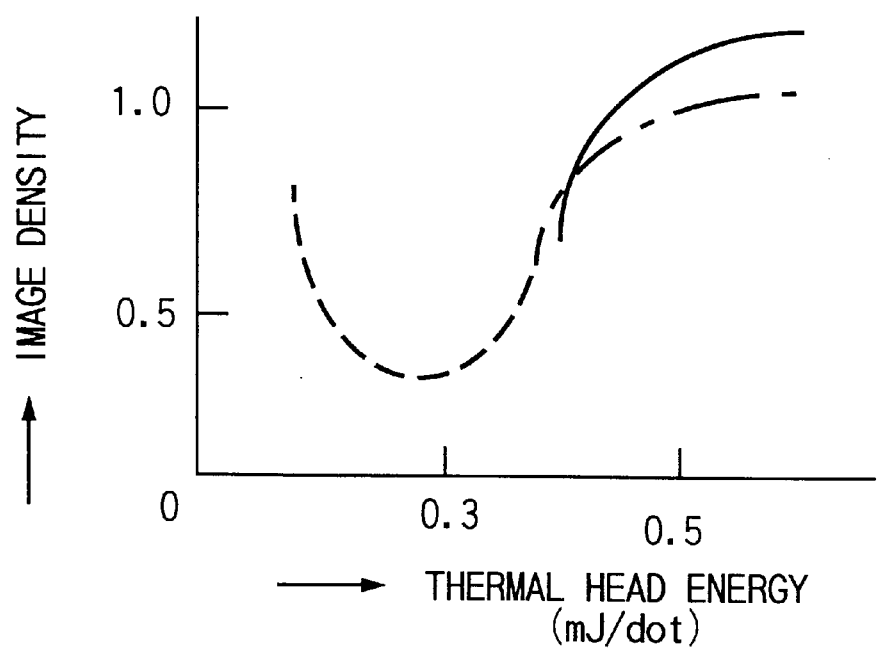
FIG. 7 is a graph showing a recording characteristic by a thermal head for the image recording section.

Recording and erasing sensitivities of the rewritable recording layers 54, 55 are shown in FIG. 7. FIG. 7 shows characteristics of a change in image density when an applied energy of a thermal head is changed, wherein the thermal head with a resolution of 8 dots/mm is driven and a solid pattern is recorded at a transport speed of the wireless data storage medium of 40 mm/sec. The ordinate represents an image density of the image recording section 52 and the abscissa represents an applied energy of the thermal head given to the image recording section 52. Besides, a solid line in the figure shows a recording sensitivity of the black recording layer and a dashed line shows a recording sensitivity of the red recording layer. Erasing sensitivities of both recording layers show almost the same values.

In such a manner, the image recording section 52 can repeatedly record and erase an image by changing a magnitude of the applied energy to the thermal head, which is a recording head. Herein, the recording energy is set at 0.7 mJ/dot and the erase energy is set at 0.35 mJ/dot and thereby, recording or erase of an image on the image recording section 52 can repeatedly performed.

A wireless data storage medium of a two-color rewritable recording type pertaining to the second embodiment has a feature in addition to the above mentioned features of a wireless data storage medium of a rewritable recording type that a character (column) or a sequence of characters (column), a figure or a sequence of figures and the like which attention should be called to can be displayed in various colors.

Next, a third embodiment will be described.

Figure 8A:
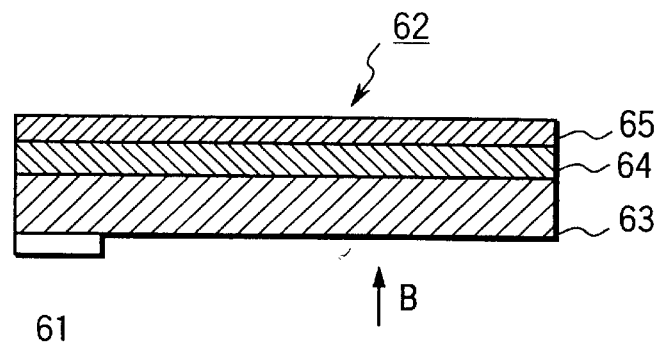
FIG. 8A is a longitudinal sectional view as seen from a side showing a model of a wireless data storage medium pertaining a third embodiment.

FIG. 8A shows a model of a wireless data storage medium pertaining to the third embodiment. The wireless data storage medium pertaining the third embodiment comprises a wireless data storage section 61, and a two-color heat sensitive recording type image recording section 62, a wireless data storage section 61 is bonded at an end of the rear side of the image recording section 62 and thus both are made to be one body. Since the wireless data storage section 61 has the same structure as the wireless data storage section 1 already described in the first embodiment, description thereon is omitted.

The image recording section 62 is fabricated in such a manner that a heat sensitive recording layer developing black 64 and a heat sensitive recording layer developing red are sequentially stacked on a base material 63 in the shape of a sheet made of wood free paper having a thickness of about 100 μm. A medium in which different heat sensitive recording layers which develops respective different colors are stacked and two-color recording which are discernible from each other by different recording energies is performed is called a two-color heat sensitive recording medium of a color addition type.

In such a two-color heat sensitive recording medium, if recording is conducted at a low recording energy (in the heat sensitive recording layer 64), only red is developed and if recording is conducted at a high recording energy (in the heat sensitive recording layer 65), red and black both are developed to show reddish black. Such heat sensitive recording media are disclosed in Jpn. Pat. Appln. KOKOKU Publication No. 49-27708, Jpn. Pat. Appln. KOKAI Publication Nos. 56-99697 and 9-7634 and the like.

The heat sensitive recording layers 64, 65 are composed of, for example, a heat sensitive recording layer mainly including a leuco dye and a color developing agent. As a leuco dye, preferred is, for example, a leuco compound of triphenylmethane base, fluoran base, phenothiazine base, auramine base, spiropyran base, indolinophthalide base or the like. In a concrete manner, the following dyes are named, but there is no specific limitation to them, which are fluoran based black dyes, such as 3-diethylamino-7-o-chloroanilinofluaran, 3-diethylamino-7-o-fluoroanilinofluoran, 3-(N-methy-p-toluidino)-6-methyl-7-anilinofluoran and the like; fluoran based red dyes, such as 3-diethyamino-6-methyl-7-chlorofluoran, 3-diethyamino-7, 8-benzofluoran and the like; and lactam based red dyes, such as rhodamine-B-anilinolactam, rhodamine(p-nitroanilino) lactam and the like. It is needless to say that there is no specific limitation to the above.

As a color developing agent, the following are preferred, which are various kinds of compound of a electron acceptor type which develop a color when the compound gets into contact with the leuco dye compound, for example a phenol compound, thiophenol compound, a thiourea derivative, an organic acid and a metallic salt thereof and the like.

It is preferred that a static color developing temperature of the black heat sensitive recording layer 64 is equal to, or higher than a static color developing temperature of the red heat sensitive recording layer 65 and it is preferred to be in the range of 40 to 100° C. in a definite manner. Especially, in the case where a wireless data storage medium which requires heat resistance of a print image, a static color developing temperature preferably is 60° C. or higher.

The static color developing temperature is a temperature which is measured in a condition that a heated plate is pressed to a recording medium at the temperature for one minute. Herein, color developing temperatures of the heat sensitive recording layers 64, 65 were adjusted so that the layers 64, 65 began to develop a color at about 45° C. and show the maximal density at about 60° C. Thicknesses of the heat sensitive recording layers 64, 65 were set to be about 3 μm each.

Figure 8B:
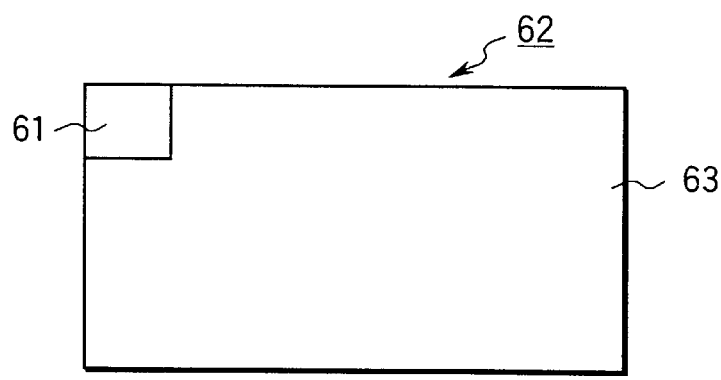
FIG. 8B is a rear view as seen from in the direction an arrow mark B of FIG. 8A showing the model of a wireless data storage medium pertaining to a third embodiment.

Thus obtained two-color heat sensitive recording medium was cut into, for example, a sheet of A5 size and the image recording section 62 of a two-color heat sensitive recording type in A5 size was fabricated as shown in FIG. 8B. As shown in FIG. 8B, the wireless data storage section 61 was bonded with a pressure sensitive adhesive to a corner on the base material 63 of the image recording section 62 to complete a wireless data storage medium of a two-color heat sensitive recording type, for example, for process control.

Figure 9:
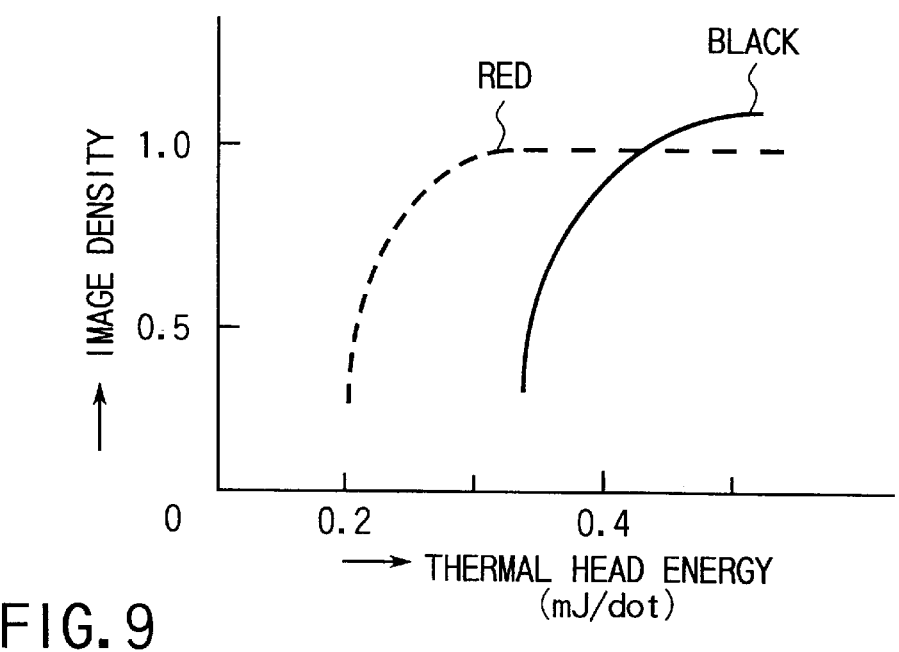
FIG. 9 is graph showing a recording characteristic by a thermal head the image recording section.

FIG. 9 shows energy density characteristics when an image is recorded using a thermal head with a resolution of 8 dots/mm on thus obtained the wireless data storage medium of a two-color heat sensitive recording type, wherein red shows a result of measurement when a magenta measuring filter is used and black shows a result of measurement when a neutral filter is used. As can be seen from the graph, the medium begins to develop a red color at about 0.2 mJ/dot and the density is saturated at about 0.3 mJ/dot. When an energy goes beyond about 0.33 mJ/dot, the medium begins to develop a black color to produce a mixed color of red and black. When an energy is further raised beyond about 0.5 mJ/dot, black development is saturated but color becomes reddish black.

Therefore, if an applied energy of a thermal head, which is a recording head, is controlled to 0.3 mJ/dot, a red image can recorded and if the applied energy is controlled to 0.5 mJ/dot, a black image can be recorded. That is, if a heat generating resistor of the thermal head is driven at the above mentioned applied energies in correspondence to red or black of the corresponding image data, red and black images can be recorded.

The wireless data storage medium of a two-color heat sensitive recording type pertaining to the third embodiment has the wireless data storage section which is strong against an external mechanical stress and the image recording section which is excellent in flexibility and soft, and which occupies a larger percentage of the whole wireless data storage medium, so that the medium is subject to easy deformation.

In the image recording section, in this case, a black or red image can be stored in any position or area therein, or images can be written in a designated position or area according to a kind of an image display. Alternately, a character (column) or a sequence of characters (column) showing a notice to which attention should be called can be recorded in red. In the third embodiment, since the image recording section is of a shape like a sheet of a large size, the medium can directly be fixed to a commodity.

A fourth embodiment will be described.

Figure 10A:
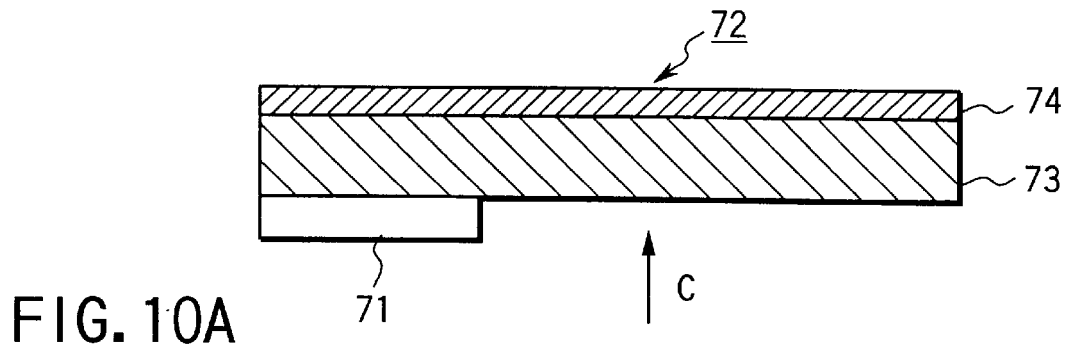
FIG. 10A is a longitudinal sectional view as seen from a side showing a model of a wireless data storage medium pertaining to a fourth embodiment.
Figure 10B:
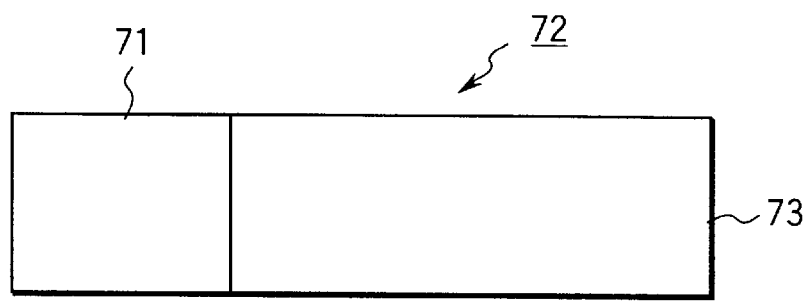
FIG. 10B is a rear view as seen from in the direction of an arrow mark C of FIG. 10A showing the model of a wireless data storage medium pertaining to a fourth embodiment.

FIGS. 10A, 10B show a model of a wireless data storage medium pertaining to the fourth embodiment. The wireless data storage medium pertaining to the fourth embodiment comprises a wireless data storage section 71 and an ink jet recording type image recording section 72, and the wireless data storage section 71 is bonded to an end of the rear side of the image recording section 72 so that both assume a one body structure. Since the wireless data storage section 71 has the same structure as the wireless data storage section 1 already described in the first embodiment, description thereon is omitted.

The image recording section 72 is fabricated so that a porous ink receiving layer 74 composed of inorganic particles (not shown) and a binder (not shown) is stacked on a base material 73 like a sheet made of a wood free paper having a thickness of about 100 μm. The ink receiving layer 74 efficiently absorbs ink which flies over and attached to the ink receiving layer 74 by an action of a porous structure. As fine particles used for the ink receiving layer 74, there are available silica, porous alumina hydrate or the like. A diameter of a primary particle preferably is 200 Å or less. As a binder, it is preferred to use water-soluble high polymer such as polyvinyl alcohol.

The ink receiving layer 74 may be made from a porous high polymer. When the high polymer is used, the high polymer is dispersed in a liquid to prepare a coating solution, the coating solution is applied and thus formed coat is dried to produce pores. As a fabricating method, various kinds of methods have been proposed.

Herein, alumina sol which had a solid content of 18 wt %, which had been synthesized by a hydrolysis and deflocculation of aluminum alkoxide and a polyvinyl alcohol aqueous solution of 6 wt % were mixed with each other to prepare a coating solution for the ink receiving layer. Synthesis of porous aluminum hydrate is disclosed in Jan. Pat. Appln. KOKAI Publication No. 7-76161.

The coating solution was applied on a wood free paper as (base material) 71, on which a filler layer (not shown) for filling is provided, to a thickness after drying of 10 μm and the coat is dried to form an ink receiving layer 74, whereby an ink jet recording medium was obtained.

In this embodiment, while an ink receiving layer was provided in order to obtain an image with a high print quality, all that is required is that a base material has an ink absorbing property when special print quality is not required and the ink receiving layer is unnecessary if the base material has such a property. An additive which increases durability in cooperation with a coloring component of the ink can be mixed into the ink receiving layer.

Thus obtained ink jet recording medium was cut into a piece of the shape of a label each having a length of 60 mm and a width of 30 mm. The label was used as an image recording section 72 and a wireless data storage section 71 was bonded with an adhesive to an end on a base material 73 as shown in FIG. 10B and thus a wireless data storage medium of an ink jet recording type, for example, used for commodity transportation was completed.

In a wireless data storage medium of an ink jet recording type pertaining to the fourth embodiment, a wireless data storage section is rigid and strong against an external mechanical stress, an image recording section is excellent in flexibility and soft and in addition the image recording section assumes a large occupancy percentage of the whole wireless data storage medium, whereby the medium is can be deformed with ease.

Image recording to the image recording section can be performed in a non-contact manner and if a color of an ink used for ink jet recording is changed, any color can be selected in image recording.

Since the wireless data storage section and the image recording section are bonded with a pressure sensitive adhesive, the following cases can be realized in which a recording sheet which is an image recording section is peeled off and handed over to a sender as a certificate for keeping a parcel from a transporter when the parcel is collected or a transporter receives a recording sheet which is again an image recording section as a certificate for delivery from a receiver when the parcel is delivered.

Even when an image recording section, which is weak in durability as compared with a wireless data storage section having a durability against a mechanical stress, is broken, neither damage nor stain is received by the wireless data storage section and the image recording section can be replaced with a new one.

A fifth embodiment will be described.

Figure 11A:
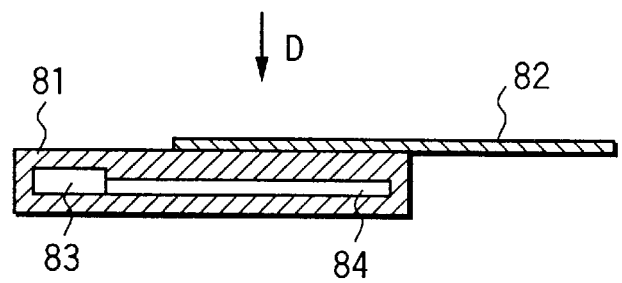
FIG. 11A is a longitudinal sectional view as seen from a side showing a model of a wireless data storage medium pertaining to a fifth embodiment.
Figure 11B:
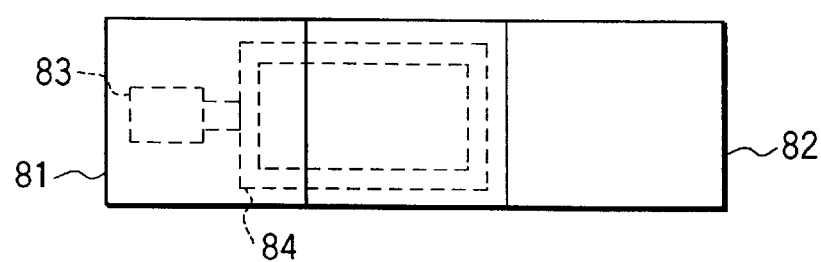
FIG. 11B is a front view as seen from in the direction of an arrow mark C in FIG. 11A.

FIGS. 11A, 11B show a model of a wireless data storage medium pertaining to the fifth embodiment. The wireless data storage medium pertaining to the fifth embodiment comprises a wireless data storage section 81 and a rewritable image recording section in the shape of thin sheet having a rewritable recording layer on which a visual image is repeatedly recorded and displayed, and the wireless data storage section 81 and the image recording section 82 are bonded to form one body so that an antenna mounting section of the wireless data storage section 81 and part of the image recording section 82 are superposed on each other.

The wireless data storage section 81 sends and receives data by radio communication in a non-contact condition, and stores and reads the data, and comprises an LSI chip 83 composed of various kinds of circuits for sending and receiving data, and an antenna 84 having the shape of a loop, wherein the LSI chip 83 and the antenna 84 are molded by a resin molding into one body. The LSI chip 83 is, as shown in FIG. 11A, 11B, disposed outside the antenna 84 in the shape of a loop. In the embodiment, a size of the wireless data storage section 81 is 30×60 mm$^2$ and the antenna extends over 40 cm in a direction of a side of 60 mm.

Since the LSI chip 83 has the same structure as the LSI chip 12 described in the first embodiment, description thereon is omitted.

In such a manner, the wireless data storage section 81 of the wireless data storage medium in the embodiment has a feature that it has a large antenna forming area in which the antenna 84 is formed and the antenna forming area and the LSI chip forming area are separated from each other.

The image recording section 82 is a rewritable image recording section and a structure, material and a recording performance thereof are the same as those of the image recording section 2 used in the first embodiment and shown in FIG. 4 and there is used a combination between a leuco based dye and a phenol compound having a long chain alkyl group.

Since a fabrication method for the image recording section 82 is the same as that described in the first embodiment, description on the method is omitted.

A rewritable recording medium fabricated in the same method as the method described in the first embodiment was cut into a piece like a label having a length of 60 mm and a width of 30 mm. This was used as the image recording section 82 and as shown in FIGS. 11A, 11B, part of the image recording section 82 is bonded so as to be superposed on only the antenna mounting section, wherein the image recording section 82 and the whole wireless data storage section 81 are not superposed, whereby a wireless data storage medium pertaining to the fifth embodiment was completed.

Since the wireless data storage medium pertaining to the fifth embodiment is larger in antenna forming area than the wireless data storage media of the first to the fourth embodiments, data sending and receiving can be performed over a larger earth area. Since the image recording section is disposed outside the LSI chip which is comparatively weak to a mechanical stress, a chance when the LSI chip receives a damage is small and in addition since part of the image recording section is extended beyond the wireless data storage section, the size of the image recording section is not affected by the size of the wireless data storage section and the image recording section can secure a large area for its own.

As described above in a detailed manner, according to a wireless data storage medium of the present invention, since the medium can store and read data concerning a commodity to which the medium is attached in a non-contact condition by radio communication, a predetermine processing can be performed on the commodity without a person's physical help using electronic information which is stored.

While in a kind such as has conventionally been called as a radio tag which is a wireless data storage element, read through a gadget such as a reader/writer as read means has been indispensable to confirm a content of storage, according to a wireless data storage medium of the present invention, since at least part of data stored is recorded and displayed as a visible data, a person can confirm data on a commodity with the naked eye if necessary.

Since a wireless data storage medium has a structure in which the wireless data storage section and an image recording section are bonded so that only part of the image recording section superposes on the wireless data storage section, a variety of combinations of parts or sections can be realized. For example, sizes of both sections can independently determined with freedom.

Since a wireless data storage section which has durability enough to protect an incorporated wireless data storage element and an image recording section excellent in flexibility are made to be one body, the wireless data storage section is hard to be broken but the wireless data storage medium has flexibility as a whole. In addition, as an image recording section, sections with various recording characteristics can be used, which are a section suitable for a heat sensitive recording type, a section suitable for a reusable rewritable recording, a section suitable for ink jet recording and the like.

Fabrications of a wireless data storage section and an image recording section can independently be performed, various processes can be applied for fabrication of the wireless data storage medium.

In a wireless data storage medium provided with an image recording section by ink jet recording, since non-contact communication can be performed on an image recording section as in a wireless data storage section, processings on not only the wireless data storage section but the image recording section can both be performed in a non-contact condition. Therefore, even if a wireless data storage section protrudes on a wireless data storage medium, which is no disturbance to an image recording section, and image recording can be performed on an image recording section disposed above a mounting section for a wireless data storage section.

Since an image recording section which has a large occupancy percentage in a wireless data storage medium is excellent in flexibility and has a shape like a sheet, any shape of a commodity can be attached by a wireless data storage medium with ease.

Since a wireless data storage section is rigid and strong against external mechanic stress, whereas an image recording section is excellent in flexibility and occupies a large area percentage of the whole wireless data storage medium, the medium can be deformed with ease and by this feature, a high reliability in a wireless data storage section is secured and at the same time, an embodiment of an image recording section satisfactorily has no uneasy feeling as a price tag and a parcel tag with those which have conventionally be used.

Since an image can repeatedly be recorded or erased in an image recording section and data can also repeatedly be stored or erased in a wireless data storage section as well, recycling of the sections can be possible.

If an image recording section is provided with image recording layers in which recording in different colors can be performed, a character (column) or a sequence of characters (column), or a figure or a sequence of figures or the like to which should call attention can be displayed with a different color.

Since the wireless data storage section and the image storage section are bonded with an adhesive, a recording sheet which is an image storage section is peeled off and handed over to a sender as a certificate for keeping a parcel from a transporter when the parcel is collected or a transporter receives a recording sheet which is an image storage section as a certificate for delivery from a receiver when the parcel is delivered. Even when an image recording section, which is weak in durability as compared with a wireless data storage section having a durability against a mechanical stress, is broken, neither damage nor stain is received by the wireless data storage section and the image storage section can be replaced with a new one.

Since the wireless data storage medium is larger in antenna forming area, data sending and receiving can be performed over a larger earth area. Since the image recording section is disposed outside the LSI chip which is comparatively weak to a mechanical stress, a chance when the LSI chip receives a damage is small and in addition since part of the image recording section is extended beyond the wireless data storage section, the size of the image recording section is not affected by the size of the wireless data storage section and the image recording section can secure a large area for its own.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless data storage medium which stores data and supplies data externally, comprising:

an image recording section for rewritably recording and displaying a visible image having a connecting section and a non-connecting section, the non-connecting section being larger in size than the connecting section;

a wireless data storage section having a connecting portion and a non-connecting portion, the non-connecting portion being larger in size than the connecting portion, the connecting portion being bonded with the connecting section of the image recording section, and a LSI chip provided within the non-connecting portion of the wireless data storage section, the LSI chip adapted to store and read data obtained by performing communication with an external system.

2. A wireless data storage medium according to claim 1, further comprising an antenna portion connected to the LSI chip, and molded within the non-connecting portion of the wireless data storage section.

3. A wireless data storage medium according to claim 1, wherein the image recording section is larger in size that the wireless data storage section.

4. A wireless data storage medium according to claim 1, wherein the image recording section has a lower rigidity than the wireless data storage section and the image recording section has a higher flexibility than the wireless data storage section.

5. A wireless data storage medium according to claim 1, wherein the image recording section comprises plural display sections respectively developing different colors.

6. A wireless data storage medium according to claim 1, wherein the image recording section comprises:

a first display section, in which is stacked on the first display section, and in which a red color image can repeatedly be recorded or erased.

7. A wireless data storage medium according to claim 1, wherein the wireless data storage section is formed of base material having rigidity in such a manner as to be molded into a single body, and comprises a through-port.

8. A wireless data storage medium according to claim 1, wherein the image recording section comprises a first rewritable recording portion in which a black image is rewritably recorded or erased and a second rewritable recording portion in which a colored image other than black is rewritably recorded or erased.

9. A wireless data storage medium according to claim 1, wherein the image recording section comprises a first rewritable recording portion in which a black image is rewritably recorded, and a second rewritable recording portion which is stacked on the first rewritable recording portion, and in which a colored image other than black is rewritable recorded.

10. A wireless data storage medium according to claim 1, wherein the wireless data storage section is shaped to a card structure parallel with a sheet structure of the image recording section.

* * * * *